United States Patent [19]

Walker

[11] Patent Number: 4,495,692

[45] Date of Patent: Jan. 29, 1985

[54] COIL PLACING MACHINE WITH READILY CONVERTIBLE WEDGE MAKING ARRANGEMENT

[75] Inventor: Robert G. Walker, Ossian, Ind.

[73] Assignee: Industra Products, Inc., Fort Wayne, Ind.

[21] Appl. No.: 389,856

[22] Filed: Jun. 18, 1982

[51] Int. Cl.³ ............................................. H02K 15/00
[52] U.S. Cl. .................................. 29/564.1; 29/564.6; 29/596; 29/734
[58] Field of Search ................. 29/564.1, 564.3, 564.5, 29/564.6, 733, 734, 735, 736, 732, 564.8, 596, 598

[56] References Cited

U.S. PATENT DOCUMENTS

| | | | |
|---|---|---|---|
| 3,447,225 | 6/1969 | Eminger | 29/596 |
| 3,508,316 | 4/1970 | Hill | 29/792 |
| 3,514,836 | 6/1970 | Mason | 29/564.2 |
| 3,579,818 | 5/1971 | Arnold et al. | 29/596 |
| 3,634,932 | 1/1972 | Mason | 29/564.6 |
| 3,643,317 | 2/1972 | Arnold et al. | 29/564.6 |
| 3,742,596 | 7/1973 | Smith et al. | 29/564.6 |
| 3,778,890 | 12/1973 | Schlaudroff | 29/564.6 |
| 4,136,433 | 1/1979 | Copeland | 29/564.6 |
| 4,233,728 | 11/1980 | Pieper | 29/564.6 |
| 4,313,251 | 2/1982 | Asai et al. | 29/564.6 |

FOREIGN PATENT DOCUMENTS 2021447 12/1979 United Kingdom ................. 29/596

*Primary Examiner*—William R. Briggs
*Attorney, Agent, or Firm*—Albert L. Jeffers; Anthony Niewyk

[57] ABSTRACT

An improvement in devices for placing prewound coils and insulating wedges into slots of dynamoelectric machine stator cores, for example in manufacturing electric motors, is disclosed with the device having a wedge making apparatus including a drive, an arrangement for cutting insulating wedges from a strip of insulating material, and an arrangement for forming the wedges into a magazine for subsequent insertion into stator core slots. The improvement provides for the quick conversion of the device from operation on one stator core configuration to operation on a different stator core configuration without removing any bolts from the device with the improved wedge making apparatus actuating arrangement including an elongated bipartite material cut-off drive bar for coupling the drive to the cutting arrangement, an elongated bipartite wedge forming drive bar coupling the drive to the arrangement for forming the wedges into the magazine with both the bipartite drive bars being separable into two parts to allow removal of the cutting and forming arrangements from the device without disturbing the drive. Each bipartite drive bar includes a clamping bolt received in a slot of one bipartite part so that the bars are readily separable by merely loosening the bolt. A readily separable arrangement for indexing the magazine may also be provided so that the magazine and cutting and forming arrangements may be removed from the device and replaced by substitute portions adapted to a different stator core configuration with minimal difficulty.

4 Claims, 6 Drawing Figures

COIL PLACING MACHINE WITH READILY CONVERTIBLE WEDGE MAKING ARRANGEMENT

BACKGROUND OF THE INVENTION

The present invention relates generally to the fabrication of dynamoelectric machines and in particular to the placement of windings in stator cores for such machines.

DESCRIPTION OF THE PRIOR ART

In the art of manufacturing electric motors and the like it is fairly common for motor windings to be wound on a coil form and then the completed coil positioned in the magnetic core of the motor utilizing machines frequently referred to as coil placers or coil injection machines. U.S. Pat. No. 3,324,536 is illustrative of such machines and represents one machine in which the present invention has particular utility. Briefly, devices of the type illustrated in this patent have a plurality of upstanding, parallel rods, fingers or blades over which prewound coils are placed to thereafter receive a stator core held firmly in a proper position for subsequent coil insertion. A reciprocable member known as a stripper moves along these finger elements engaging the prewound coils and moving those coils into proper position within the stator core. Multiple coils may be simultaneously inserted and intermixed with insulating wedges as desired. Machines of this type also include a so-called wedge maker for cutting and forming insulating wedges from a strip supply of insulating material such as Mylar so that the cut and formed wedges may be positioned within the stator core along with the windings. The insulating wedges are cut and formed one at a time to be positioned in a generally cylindrical magazine having a cross-sectional configuration compatible with the cross-sectional configuration of the stator core so that after an entire set of insulating wedges are formed and located in the magazine these wedges may be displaced from that magazine in an axial direction into the stator core simultaneous with the stroke of the stripper. The general operation of such a coil placing machine is more fully discussed in the aforementioned United States Patent, the entire disclosure of which is specifically incorporated herein by reference.

In machines of the type thus far discussed, the configuration of the insulating wedge receiving magazine as well as the configuration of the upstanding blades or fingers which support the stator core must be tailored to a particular stator core or class of stator core configurations and when converting a coil placing machine from operation on one stator core configuration to another, this tooling including the wedge receiving magazine must be removed from the machine to be replaced by another of appropriate configuration for the new stator core. The conversion of the device from one core configuration to another represents a substantial expense in terms of lost machine time, lost operator time and the time required for an appropriate individual to make the tooling switch. The changeover expense is so substantial that numerous attempts have been made to quickly (U.S. Pat. No. 3,505,721) or automatically (U.S. Pat. No. 4,156,964) adapt the machine to different stator core configurations. These last two patents have been pretty much limited to accomodating stators of substantially the same cross-sectional configuration but of varying stack height in the axial direction. The quick adaptation of a coil placing machine to a stator core having a substantially different cross-sectional configuration would be highly desirable.

The structure and operation of coil placing machines generally is well described in the aforementioned two United States Patents while the structure and operation of the wedge making portion of such machines is aptly described in U.S. Pat. No. 3,649,887, hence, in the sequel only so much of the machine operation generally as is necessary for an understanding of the present invention will be described, and reference may be had to these three prior United States Patents for a more complete description of what has now become commonplace in this art.

SUMMARY OF THE INVENTION

Among the several objects of the present invention may be noted the reduction in "down time" of a coil placing machine; the provision of a device for placing prewound coils and insulating wedges into slots of a dynamoelectric machine stator core in which the tooling may be easily and quickly changed to adapt the device to different stator core configurations; the provision of a coil placing machine which allows an unskilled machine operator to change tooling without removing any bolts from the machine; and the provision of a coil placing machine wherein the transition from one stator core configuration to another may be accomplished in minimum time with maximum utilization of common components and substitution of a minimal number of parts. These as well as other objects and advantageous features of the present invention will be in part apparent and in part pointed out hereinafter.

In general, a device for placing prewound coils and insulating wedges into slots of a dynamoelectric machine stator core is converted from operation on one stator core configuration to operation on a different stator core configuration by loosening a first bolt which clamps parts of a material cut-off drive bar together, loosening a second bolt which clamps parts of a wedge forming drive bar together, removing the structure for cutting insulating wedges from a strip of insulating material and the structure for forming those cut wedges into a magazine for subsequent insertion into stator core slots from the device, and replacing the removed portion with a similar portion adapted to the different stator core configuration. The wedge receiving magazine is typically included in the structure which is removed.

Also in general and in one form of the invention, a coil placing machine has wedge making capability with a power source or drive means including a wedge maker drive shaft with cams, cam followers and linkages for actuating an arrangement for cutting insulating wedges from a strip of insulating material and an arrangement for forming these wedges into a magazine for subsequent insertion into stator core slots. The wedge making apparatus includes an elongated bipartite material cut-off drive bar for coupling the drive to the cutting arrangement as well as an elongated bipartite wedge forming drive bar for coupling the drive to the forming arrangement with both bipartite drive bars being separable into two parts to allow removal of the cutting and forming arrangements from the device without disturbing the drive. The bipartite drive bars may be separably joined by bolts cooperating with slots so that those bars may be separated by the simple expedient of loosening the bolts. Typically, the wedge receiving magazine and a portion of an arrangement for selectively rotating that magazine are also removed with the cutting and forming arrangements as a unit.

BRIEF DESCRIPTION OF THE DRAWINGS

Corresponding reference numerals indicate corresponding parts throughout the several views of the drawing.

Figure 1:
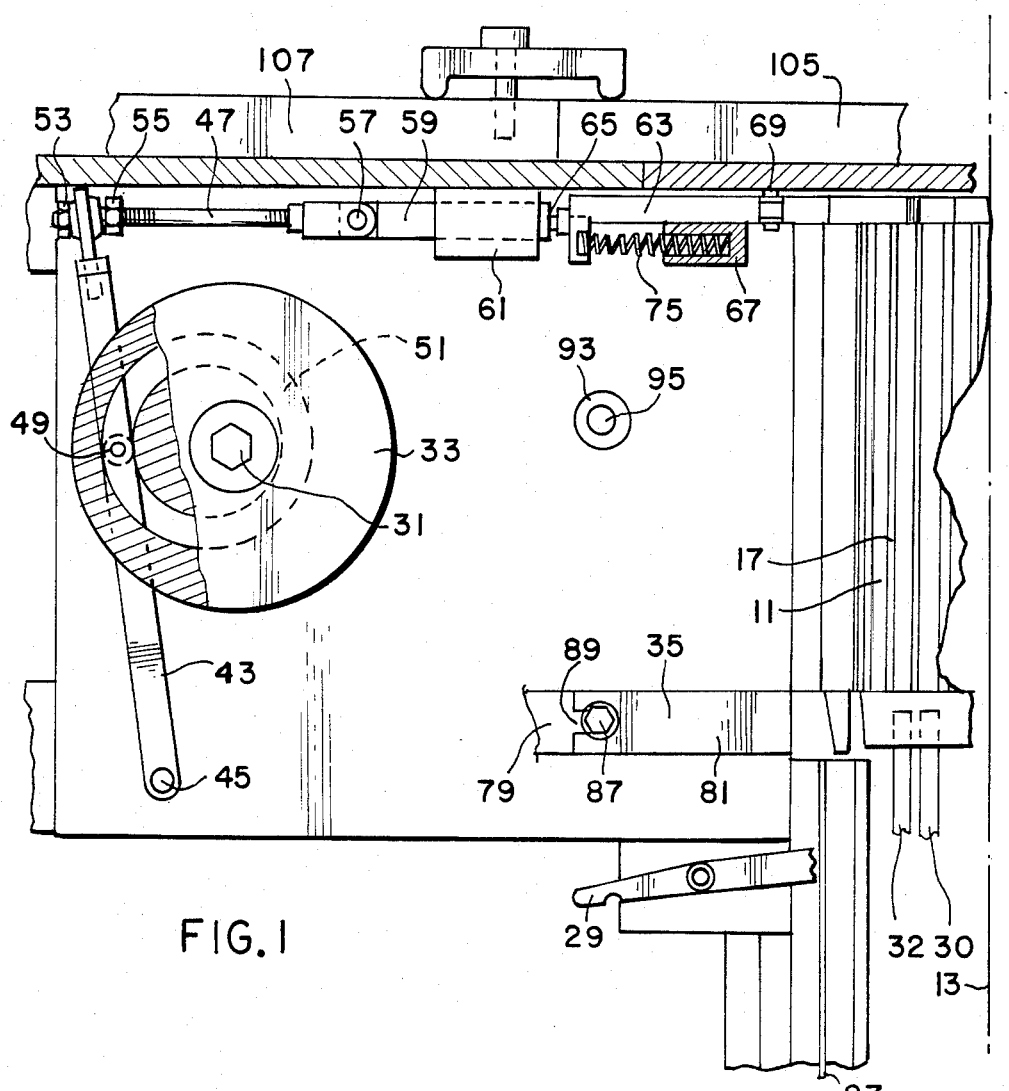
FIG. 1 is a side view in elevation and partly broken away illustrating the wedge making portion of a coil placing machine according to the present invention.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring first to the drawing in general, a cylindrical insulating wedge receiving magazine 11 is journalled for rotation about its axis 13 and has a series of longitudinal slots such as 15 and 17 about its periphery for receiving and holding insulating wedges such as 19 and 21 with the forming and loading of wedges being carried out automatically and sequentially. Typically not all of the stator slots will require insulating wedges so that the loading of magazine 11 is done according to a predetermined program which places wedges only in those magazine slots corresponding to slots of the stator which are to receive respective legs of coils. Attached to the upper end of magazine 11 is a ratchet plate 23 actuated by ratchet pawl 25 to sequentially present magazine slots to the structure of FIG. 5 which forms those wedges and places them in the slots. A spring loaded detent arrangement may be provided to hold the magazine in its sequential wedge-receiving positions. The structure including the cylindrical array of stator receiving blades 26 and wedge guides 28 for respectively receiving the coils and stator and the slot wedges, is typically located coaxial with this magazine, and above the magazine as viewed in FIG. 6, with the rods such as 30 and 32 for pushing the wedges simultaneously from the magazine being located beneath the magazine as viewed in FIG. 1. This push rod structure and the stripper for moving the coils into the stator core are both effective during a single upward pass to position coils and insulating wedges in the stator core all as more completely described in the aforementioned U.S. Pat. No. 3,324,536.

Figure 4:
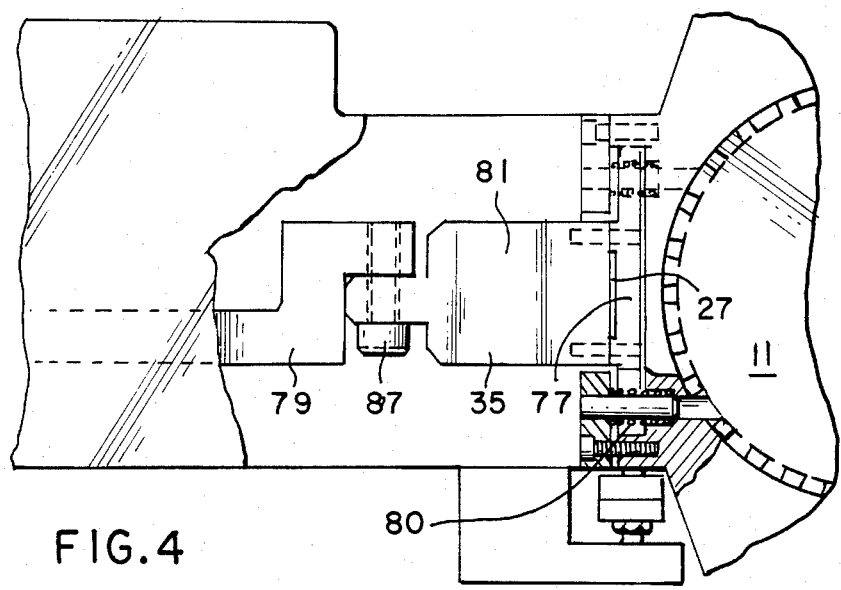
FIG. 4 is a partial cross section view along the line 4—4 of FIG. 3.
Figure 5:
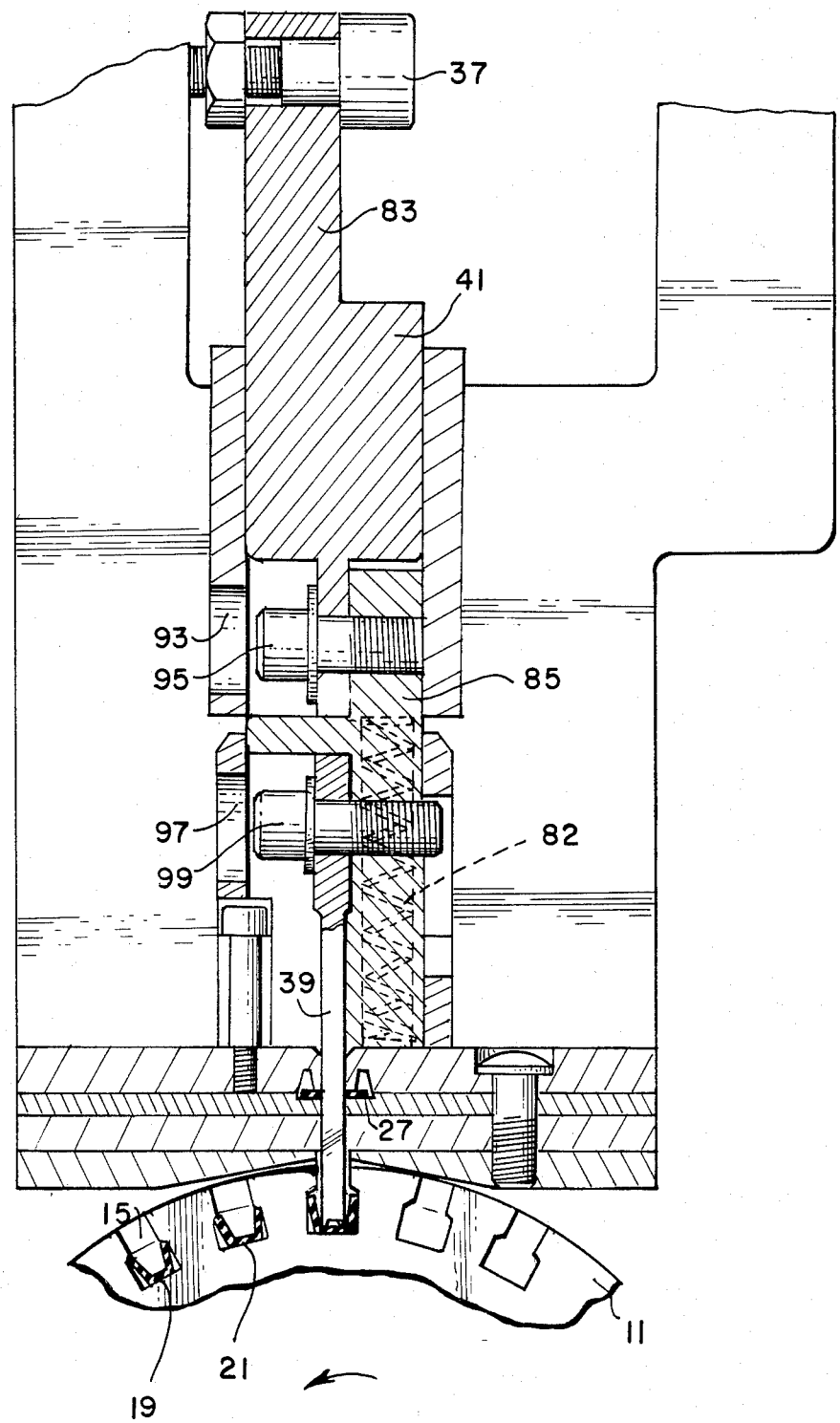
FIG. 5 is a partial cross section view along the line 5—5 of FIG. 3.
Figure 6:
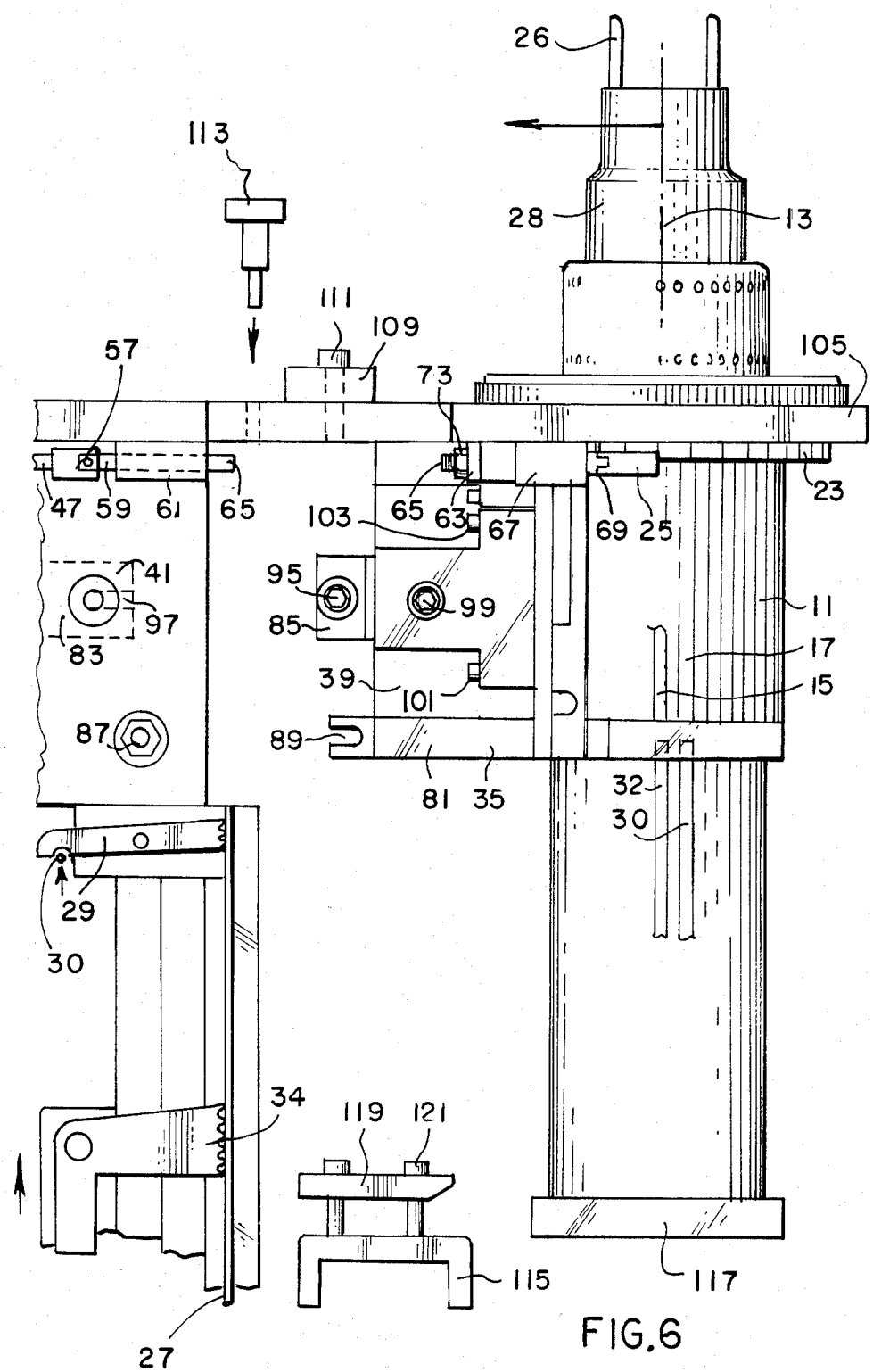
FIG. 6 illustrates separation of the specialized tooling from the machine.

Referring now specifically to FIG. 6, a strip of insulating material 27 of a material such as Mylar is supplied from a large material reel (not shown) and is moved upwardly as viewed in increments by a gear and off-center pin arrangement having a series of lever arms and pawl 34 to engage insulating material 27 and move it the desired length. Slippage against this direction of movement is prevented by a spring 30 loaded, stationary pawl 29 with the feed mechanism per se being more completely described in the aforementioned U.S. Pat. No. 3,694,887. The wedge making structure of FIG. 1 includes wedge maker driveshaft 31 which is geared to the material advance mechanism and which supports one or more cams such as cam 33 and comprises the power source or drive for the wedge making structure illustrated in FIG. 6. When a section of insulating material has been moved past the pawl 29 and into the wedge maker, this section is severed from the insulating material supply strip by leftward movement of the drive bar 35 which is in turn actuated by rotation of the wedge maker driveshaft 31 and a cam and linkage arrangement similar to the cam 33 but not illustrated. FIG. 4 illustrates this material cut-off structure in greater detail. Once the insulating wedge has been severed from the strip of supply material, the forming and inserting structure of FIG. 5 is actuated again by a cam engaging cam follower 37 to move punch 39 toward the insulating material forming that insulating material into the wedge and forcing that wedge into the magazine 11. Subsequent to this operation and with both drive bars 35 and 41 retracted, cam 33 is effective to increment the magazine so as to position a subsequent magazine slot in position to receive an insulating wedge. This structure for rotating or incrementing the magazine is illustrated in detail in FIGS. 1 and 2.

In FIG. 1, the arm 43 executes an oscillatory motion about its pivot 45 as cam follower 49 tracks within the eccentric slot 51 of cam 33 thus imparting an oscillatory motion to the threaded shaft 47. Shaft 47 includes a pair of adjusting nuts 53 and 55 which determine the position of pusher bar 59. Shaft 47 is coupled by way of pivot 57 to a pusher bar 59 which reciprocates within the guide block 61. Pawl pusher bar 63 merely abuts against pusher bar 59 at 65 with the abutment 65 forming the separating point between the two portions of the magazine incrementing structure. The pawl pusher bar 63 which is reciprocable in guide block 67 is in turn coupled at pivot 69 to pawl 25 which pawl is urged counterclockwise as viewed in FIG. 2 by leaf spring 71 so as to engage the teeth of ratchet plate 23. In addition to the adjustment nuts 53 and 55, a further adjustment nut 73 is provided to achieve the desired indexing of the ratchet plate 25 as cam 33 rotates. Pawl pusher bar 63 is urged into engagement with the pusher bar 59 by pawl return spring 75. It will be noted that indexing is accomplished by a pushing motion of pawl 25 against the ratchet plate 23 whereas in known prior art machines the indexing is accomplished by a pulling motion. This allows the interconnection at abutment 65 and the easy separation of portions of the indexing mechanism whereas prior art devices required a solid mechanical connection not easily separated.

Drive bars 35 and 41 are analogously coupled, for example, by cam follower 37 to a series of cams, gears and linkages in conventional manner to achieve the cutting and forming operations by a reciprocating motion of these respective drive bars. Bifurcation of the drive bars 35 and 41 which couple the drive mechanism, drive shaft 31 and its related cams, to the respective cutting and forming punches 77 and 39 where each drive bar is formed as bipartite parts 79 and 81 for cut-off drive bar 35, and 83 and 84 for forming drive bar 41 so that those bipartite parts are readily separable facilitates the ready removal and replacement of the tooling.

Drive bars 35 and 41 reciprocate under the action of the drive means in their respective directions of elongation which is generally radial to the magazine 11. A clamping arrangement in the form of bolt 87 which threadingly engages drive bar part 79 and which is received in the slot 89 of drive bar portion 81 when those drive bar portions are overlapped as illustrated in FIG. 4, allows the bipartite parts to be securely joined when the bolt is tightened and when the bolt is loosened somewhat the parts may be slid apart in the direction of elongation. Springs 80 and 82 urge bars 35, 41 outwardly to their operating positions before bolts 87, 95 are tightened. An access port 91 in the wedge maker side wall allows ready access to the bolt 87. Analogously an access port 93 allows ready access to bolt 95 which threadingly engages the forming drive bar portion 85 and similarly is received in a slot 97 in drive bar portion 83. Access port 97 and bolt 99 are provided for removing punch 39 and substituting a different punch.

Figure 2:
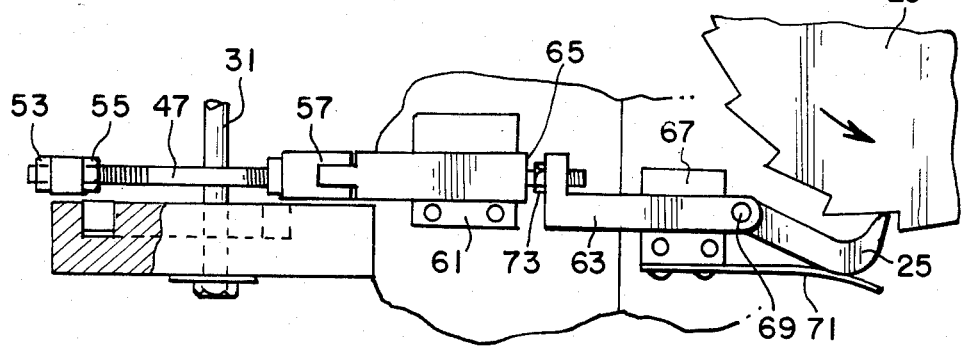
FIG. 2 is a plan view from the top of FIG. 1 illustrating the portion of the wedge making arrangement for indexing the wedge receiving magazine.
Figure 3:
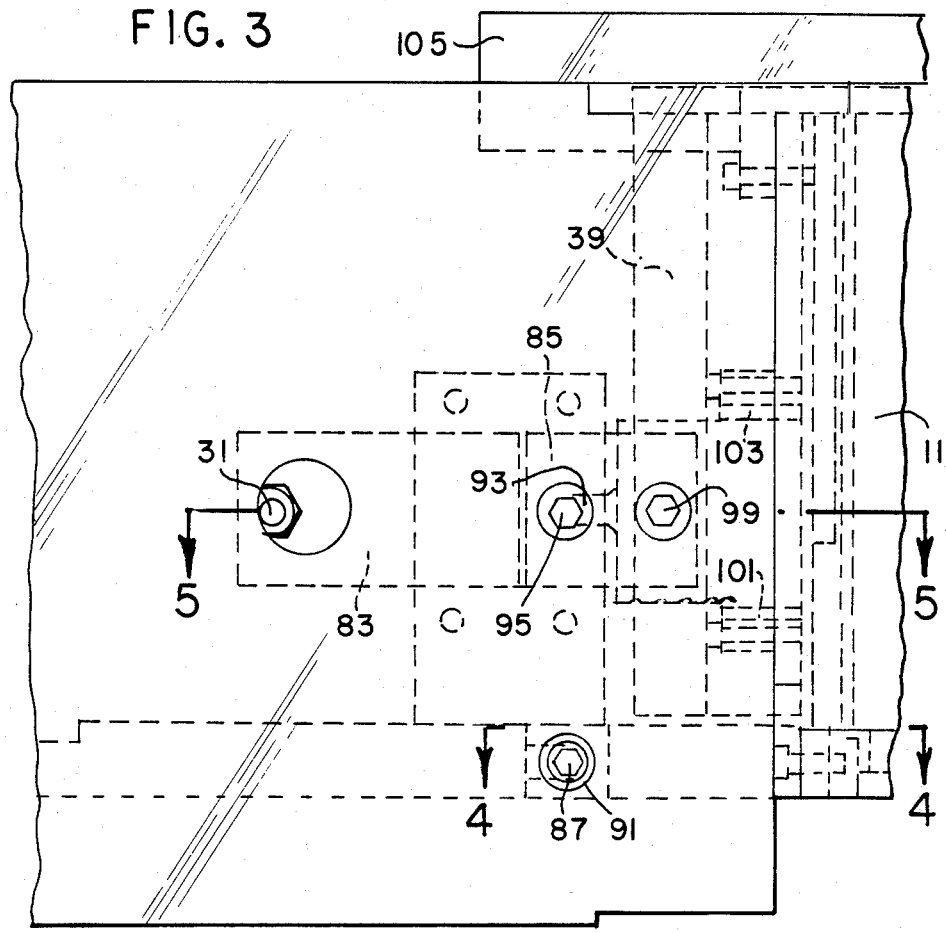
FIG. 3 is a side elevation view like FIG. 1 but illustrating in greater detail the inter-relationship of some of the wedge maker parts.

Simplistically stated, the wedge making device has universal components generally illustrated as the left hand portion of FIG. 6 which are employed regardless of the stator configuration including that structure to the left of abutment 65 in FIGS. 1 and 2 which participates in the magazine indexing operation, that structure to the left of bolt 87 in FIGS. 1, 3 and 4 which participate in the operation of severing the individual wedges from the strip material 27 and that structure to the left of bolt 95 which participates in the forming of the insulating wedges and their placement in the magazine 11 with the structure above bolt 95 in FIG. 5 corresponding to the structure to the left of that bolt in FIGS. 1 and 3. Of course, the structure rightward of abutment 65, bolt 87 and bolt 95 is, generally speaking, suited only to a limited class of stator core configuration and those specialized components are removed as a unit and replaced by another unit of specialized components when transitioning from one core configuration to another with this specialized component unit illustrated generally in the right hand area of FIG. 6 and including the magazine 11, cut-off die 77 and forming die 39, as well as the portion to the right of abutment 65 of the arrangement for selectively rotating the magazine 11. When this specialized structure is removed and another unit substituted therefore, dowel pins such as 101 and 103 along with a series of holding blocks aid in alignment of the specialized components with the remainder of the device.

For example, the tool support plate 105 (FIGS. 1 and 6) may rest on ledge 107 and be held thereon by clamps such as 109 and clamp bolts 111. Lateral alignment between tool support plate 105 and ledge 107 may be achieved by one or more dowels 113 which are merely pulled upwardly to disengage the machine framework when removing the tooling.

Also the drive platen 115 (FIG. 6) which moves upwardly as viewed driving the stripper and wedge push rods during the insertion process may have a clamp 119 and clamping bolts such as 121 which are loosened to free laterally extending portions of a base plate 117 when it is desired to change tooling.

From the foregoing it is now apparent that a novel quick-change tooling arrangement for a coil placing machine where all the tooling to be removed during stator configuration conversion is in one assembly rather than separate parts has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A device for placing prewound coils and insulating wedges into slots of a dynamoelectric machine stator core member, comprising:
    a coil placing apparatus including a cylindrical array of stator-receiving blades and wedge guide members,
    a wedge making apparatus connected to said coil placing apparatus, said wedge making apparatus including
        (a) a wedge magazine assembly having a cylindrical wedge-receiving magazine coaxial with said coil placing apparatus, said magazine having a toothed ratchet plate,
        (b) means for cutting off insulating wedges from an elongated strip of insulating material, and
        (c) means for forming the wedges into said magazine for subsequent insertion into the stator core slots,
    said cutting means and said forming means being attached to said wedge magazine assembly,
    said coil placing apparatus and said wedge making apparatus being a unitary assembly removable as a unit for substitution of differently configured coil placing apparatus and wedge making apparatus,
    a drive means for driving said wedge making apparatus, an actuating apparatus for said wedge making apparatus including
        (a) a bipartite cut-off drive bar coupling said drive means to said cutting means,
        (b) a bipartite forming drive bar coupling said drive means to said forming means,
    each said bipartite drive bar having first and second separable parts, said first parts being operatively connected to said drive means, said second parts being respectively operatively connected to said cutting means and said forming means, said second parts of both said drive bars forming parts of said wedge making apparatus,
    means for releasably connecting said first parts to respective said second parts comprising clamp means at one end of one part and a clamp receiving means at one end of the other bipartite part, and
    a bipartite actuating arm for indexing said wedge-receiving magazine, said bipartite actuating arm including
        (a) a first segment operatively connected to said drive means, and
        (b) a second segment having a spring loaded pawl for engaging and pushing said ratchet plate to thereby index said wedge-receiving magazine, said first segment and said second segment being in abutting engagement only with each other, said second segment forming a part of said wedge making apparatus whereby said pawl and said ratchet plate are removable with said coil placing apparatus and said wedge making apparatus.

2. The device of claim 1 wherein each said clamp means comprises a bolt threadedly received in the corresponding said one bipartite part.

3. The device of claim 2 wherein each said bipartite drive bar has respective ends of its said parts thereof overlapped somewhat when joined with said bolt received in a slot of the other said bipartite part so that when said bolt is tightened against the other said bipartite part, said parts are securely joined and when said bolt is loosened somewhat said parts may be separated.

4. The device of claim 1 wherein said second segment of said actuating arm includes a spring for biasing said second segment in abutting engagement against said first segment in a direction opposite the direction of actuation to thereby index said ratchet plate and said magazine.

* * * * *